United States Patent

Kratz

(10) Patent No.: US 8,681,583 B2
(45) Date of Patent: Mar. 25, 2014

(54) METHOD FOR CALCULATING SPATIAL AND TEMPORAL DISTRIBUTION OF THE GUTENBERG-RICHTER PARAMETER FOR INDUCED SUBSURFACE SEISMIC EVENTS AND ITS APPLICATION TO EVALUATION OF SUBSURFACE FORMATIONS

(75) Inventor: Michael D Kratz, Houston, TX (US)

(73) Assignee: Microseismic, Inc., Houston, TX (US)

( * ) Notice: Subject to any disclaimer, the term of this patent is extended or adjusted under 35 U.S.C. 154(b) by 386 days.

(21) Appl. No.: 13/211,496

(22) Filed: Aug. 17, 2011

(65) Prior Publication Data

US 2013/0044567 A1 Feb. 21, 2013

(51) Int. Cl.
*G01V 1/30* (2006.01)
(52) U.S. Cl.
USPC .................... 367/38; 367/14; 367/35; 702/14
(58) Field of Classification Search
USPC .............. 367/14, 35, 38; 181/105; 702/14, 15
See application file for complete search history.

(56) References Cited

U.S. PATENT DOCUMENTS

| 5,771,170 | A * | 6/1998 | Withers et al. | 702/16 |
|---|---|---|---|---|
| 7,647,183 | B2 * | 1/2010 | Jechumtalova et al. | 702/14 |
| 7,872,944 | B2 * | 1/2011 | Eisner et al. | 367/75 |
| 2009/0125240 | A1 * | 5/2009 | den Boer et al. | 702/11 |
| 2010/0262373 | A1 * | 10/2010 | Khadhraoui et al. | 702/16 |
| 2012/0092959 | A1 * | 4/2012 | Taylor et al. | 367/32 |

OTHER PUBLICATIONS

Hooge, C., et al. "Mulifractal phase transitions: the origin of self-organized criticality in earthquakes." Nonlinear Processes in Geophysics 1.2/3 (1994): 191-197.*

* cited by examiner

*Primary Examiner* — Ian J Lobo
(74) *Attorney, Agent, or Firm* — Richard A. Fagin

(57) ABSTRACT

A method for evaluating fractures induced in subsurface formations includes determining hypocenters and origin times of induced seismic events from seismic signals detected by seismic sensors deployed above a volume of the subsurface formations to be evaluated and recording the detected signals for a selected time. A modified Gutenberg-Richter exponent is determined for each induced seismic event having at least a selected number of other induced seismic events within a selected radial distance thereof. A spatial distribution of the modified Gutenberg-Richter exponents is used to determine at least one property of the induced fractures.

12 Claims, 4 Drawing Sheets

METHOD FOR CALCULATING SPATIAL AND TEMPORAL DISTRIBUTION OF THE GUTENBERG-RICHTER PARAMETER FOR INDUCED SUBSURFACE SEISMIC EVENTS AND ITS APPLICATION TO EVALUATION OF SUBSURFACE FORMATIONS

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND

The invention relates generally to the field of evaluation of seismic events occurring in the subsurface. More particularly, the invention relates to method for evaluating physical properties of subsurface formations by determining spatial and temporal distribution of the Gutenberg-Richter parameter.

In earthquake seismology the Gutenberg-Richter law expresses the relationship between the magnitude and total number of earthquakes in any given region and time period of at least that magnitude. The law is generally expressed by the formula:

$$\log N = a - bM \qquad (1)$$

wherein N represents the number of seismic events having a magnitude greater than or equal to a minimum magnitude, represented by M, and a and b are empirically determined constants. The relationship is surprisingly robust and does not vary significantly from region to region or over time when dealing with naturally occurring earthquakes (subsurface originating seismic events).

The constant b is typically equal to 1.0 in seismically active regions. This means that for every Richter magnitude 4.0 event there will be 10 Richter magnitude 3.0 events and 100 Richter magnitude 2.0 events. There is some variation of b values in the range 0.5 to 1.5 depending on the tectonic environment of the region. A notable exception is during earthquake swarms when the b value can become as high as 2.5, indicating an even larger proportion of small quakes to large ones. A b value significantly different from 1.0 may suggest a problem with the data set; e.g., it is incomplete or contains errors in calculating magnitude.

There is a tendency for the b value to decrease for smaller magnitude events. This effect is described as "roll-off" of the b value, a description due to the plot of the logarithmic version of the Gutenberg-Richter law becoming flatter at the low magnitude end of the plot. Data which perfectly follows Gutenberg Richter law plots on a straight line on a logarithmic scale. Formerly, "roll-off" in the b values was taken as an indicator of incompleteness of the data set. That is, it was assumed that many low-magnitude earthquakes were missed because fewer stations detect and record them. However, some modern models of earthquake dynamics have roll-off as a natural consequence of the model without the need for the feature to be inserted arbitrarily.

The a value generally believed to be of less scientific interest and simply indicates the total seismicity rate of the region. This is more easily observed when the Gutenberg Richter law is expressed in terms of the total number of events.

More recently, passive seismic monitoring has been applied to uses such as imaging subsurface formations without the need to use an active (controlled) seismic energy source, and in monitoring progress of subsurface formation treatments such as fracturing. The latter use includes the inducing seismic events as the formations are fractured by pumping fluid into a wellbore drilled through and hydraulically connected to certain subsurface formations. Such fracture treatment is used to increase the effective wellbore radius, so that formations containing economically useful materials such as hydrocarbons may be more effectively drained.

There is a need to determine spatial and temporal changes in the stresses induced in subsurface formations as a result of induced seismic events such as those caused by fracture treatment, so that predictions about the extent and geometry of the induced fractures may be made more accurately.

SUMMARY OF THE INVENTION

One aspect of the invention is a method for evaluating fractures induced in subsurface formations. The method includes determining hypocenters and origin times of induced seismic events from seismic signals detected by seismic sensors deployed above a volume of the subsurface formations to be evaluated and recording the detected signals for a selected time. A modified Gutenberg-Richter exponent is determined for each induced seismic event having at least a selected number of other induced seismic events within a selected radial distance thereof. A spatial distribution of the modified Gutenberg-Richter exponents is used to determine at least one property of the induced fractures.

Other aspects and advantages of the invention will be apparent from the description and claims which follow.

DETAILED DESCRIPTION

Figure 1:
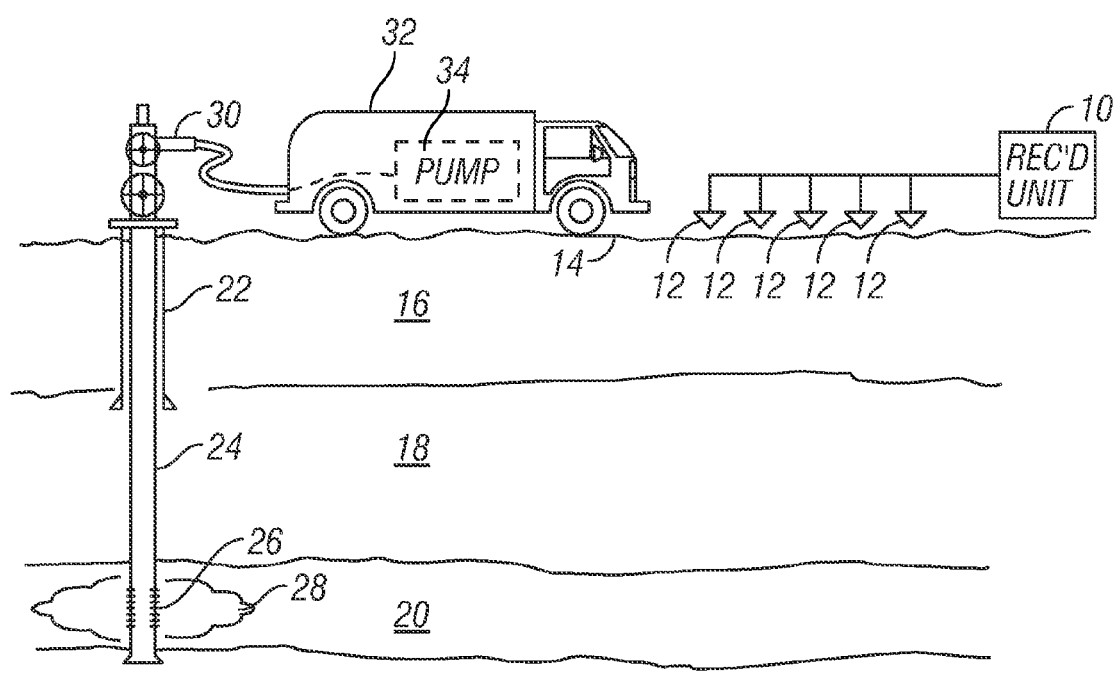
FIG. 1 shows an arrangement of seismic sensors used in a passive seismic method according to one embodiment of the invention associated with fracture treatment monitoring.

FIG. 1 shows a typical arrangement of seismic sensors as they would be used in one application of a method according to the invention. The embodiment illustrated in FIG. 1 is associated with an application for passive seismic emission tomography known as "frac monitoring." It should be clearly understood that the application illustrated in FIG. 1 is only one possible application of a method according to the invention. In general, the invention may be used with any known technique for inducing seismic events in the subsurface In FIG. 1, each of a plurality of seismic sensors, shown generally at 12, is deployed at a selected position proximate the Earth's surface 14. In marine applications, the seismic sensors would typically be deployed on the water bottom in a device known as an "ocean bottom cable." In any case, the seismic sensors 12 are typically disposed above a volume of the subsurface to be evaluated.

The seismic sensors 12 in the present embodiment may be geophones, but may also be accelerometers or any other sensing device known in the art that is responsive to velocity, acceleration or motion of the particles of the Earth proximate the sensor. The seismic sensors 12 may be single component, or multi component devices, the latter having motion sensitive axes along more than one direction; typically three mutually orthogonal directions. The seismic sensors 12 generate electrical or optical signals in response to the particle motion or acceleration, and such signals are ultimately coupled to a recording unit 10 for making a time-indexed recording of the signals from each sensor 12 for later interpretation by a method according to the invention. In other implementations, the seismic sensors 12 may be disposed at various positions within a wellbore drilled through the subsurface formations. A particular advantage of the method of the invention is that it provides generally useful results when the seismic sensors are disposed at or near the Earth's surface. Surface deployment of seismic sensors is relatively cost and time effective as contrasted with subsurface sensor emplacements typically needed in methods known in the art prior to the present invention.

In some embodiments, the seismic sensors may be arranged in radially extending lines originating proximate a wellbore 22, and extending outward therefrom along a plurality of azimuthal directions. Such arrangement used in passive seismic monitoring is provided as a service under the service mark FRACSTAR, which is a registered service mark of Microseismic, Inc., 1300 West Sam Houston Parkway South, Suite 200, Houston, Tex. 77042.

In some embodiments, the seismic sensors 12 may be arranged in sub-groups having spacing therebetween less than about one-half the expected wavelength of seismic energy from the Earth's subsurface that is intended to be detected. Signals from all the sensors in one or more of the sub-groups may be added or summed to reduce the effects of noise in the detected signals.

In some embodiments, the seismic sensors 12 may be placed in a wellbore, either permanently for certain long-term monitoring applications, or temporarily, such as by wireline conveyance, tubing conveyance or any other sensor conveyance technique known in the art.

The above mentioned wellbore 22 is shown as having been drilled through various subsurface formations 16, 18, and through a hydrocarbon producing formation 20. A wellbore casing, pipe or tubing 24 having perforations 26 formed therein corresponding to the depth of the hydrocarbon producing formation 20 is connected to a valve set known as a wellhead 30 disposed at the surface. The wellhead 30 may be hydraulically connected to a pump 34 in a frac pumping unit 32. The frac pumping unit 32 is used in the process of pumping a fluid, which in some instances includes selected size solid particles, collectively called "proppant", are disposed. Pumping such fluid to pressure that causes the formation to rupture, whether including proppant or otherwise, is known as hydraulic fracturing. The movement of the fluid is shown schematically at the fluid front 28 in FIG. 1. In hydraulic fracturing techniques known in the art, the fluid is pumped at a pressure which exceeds the fracture pressure of the particular producing formation 20, causing it to rupture, and form fissures therein. The fracture pressure is generally related to the pressure exerted by the weight of all the formations 16, 18 disposed above the hydrocarbon producing formation 20, and such pressure is generally referred to as the "overburden pressure." In propped fracturing operations, the particles of the proppant move into such fissures and remain therein after the fluid pressure is reduced below the fracture pressure of the formation 20. The proppant, by appropriate selection of particle size distribution and shape, forms a high permeability channel in the formation 20 that may extend a great lateral distance away from the tubing 24, and such channel remains permeable after the fluid pressure is relieved. The effect of the proppant filled channel is to increase the effective radius of the wellbore 24 that is in hydraulic communication with the producing formation 20, thus substantially increasing productive capacity of the wellbore 24 to hydrocarbons.

The fracturing of the formation 20 by the fluid pressure creates seismic energy that is detected by the seismic sensors 12. The time at which the seismic energy is detected by each of the sensors 12 with respect to the time-dependent position in the subsurface of the formation fracture caused at the fluid front 28 is related to the acoustic velocity of each of the formations 16, 18, 20, and the position of each of the seismic sensors 12.

Having explained one type of passive seismic data that may be used with methods according to the invention, a method for processing such seismic data will now be explained. The seismic signals recorded from each of the sensors 12 may be processed first by certain procedures well known in the art of seismic data processing, including the summing described above, and various forms of filtering. In some embodiments, as explained above, the sensors 12 may be arranged in directions substantially along a direction of propagation of acoustic energy that may be generated by the pumping unit 32, in the embodiment of FIG. 1 radially outward away from the wellhead 30. By such arrangement of the seismic sensors 12, noise from the pumping unit 32 and similar sources near the wellhead 30 may be attenuated in the seismic signals by frequency-wavenumber (f k) filtering. Other processing techniques for noise reduction and/or signal enhancement will occur to those of ordinary skill in the art.

In an example method according to the invention, it is first necessary to determine the spatial position of (the "hypocenter") and the time of origin of each seismic event caused by the particular operation used to induce the seismic events in the subsurface (e.g., the fracture treatment). One non-limiting example method that may be used advantageously to determine hypocenters and times of origin of seismic events originating in the subsurface is described in U.S. Pat. No. 7,663,970 issued to Duncan et al., entitled, "Method for passive seismic emission tomography", and incorporated by reference as if fully set forth herein. Once the hypocenters and origin times of the subsurface seismic events have been determined, they may be used as follows to determine modified values of b at some or all of the hypocenters. For purposes of description, the modified b values as described herein will be referred to as "modified Gutenberg-Richter exponents." An example procedure is as follows. For purposes of describing the invention, the symbol b' will be used to describe the modified value of b for each hypocenter with reference to spatial changes in the value thereof. Each hypocenter position for which a b' value is determinable may be referred to as a "node center" (explained below). Further, the symbol b" will be used to represent the modified value of b with reference to temporal variation (difference between times of occurrence) with respect to each hypocenter position relative to a node center.

Figure 2:
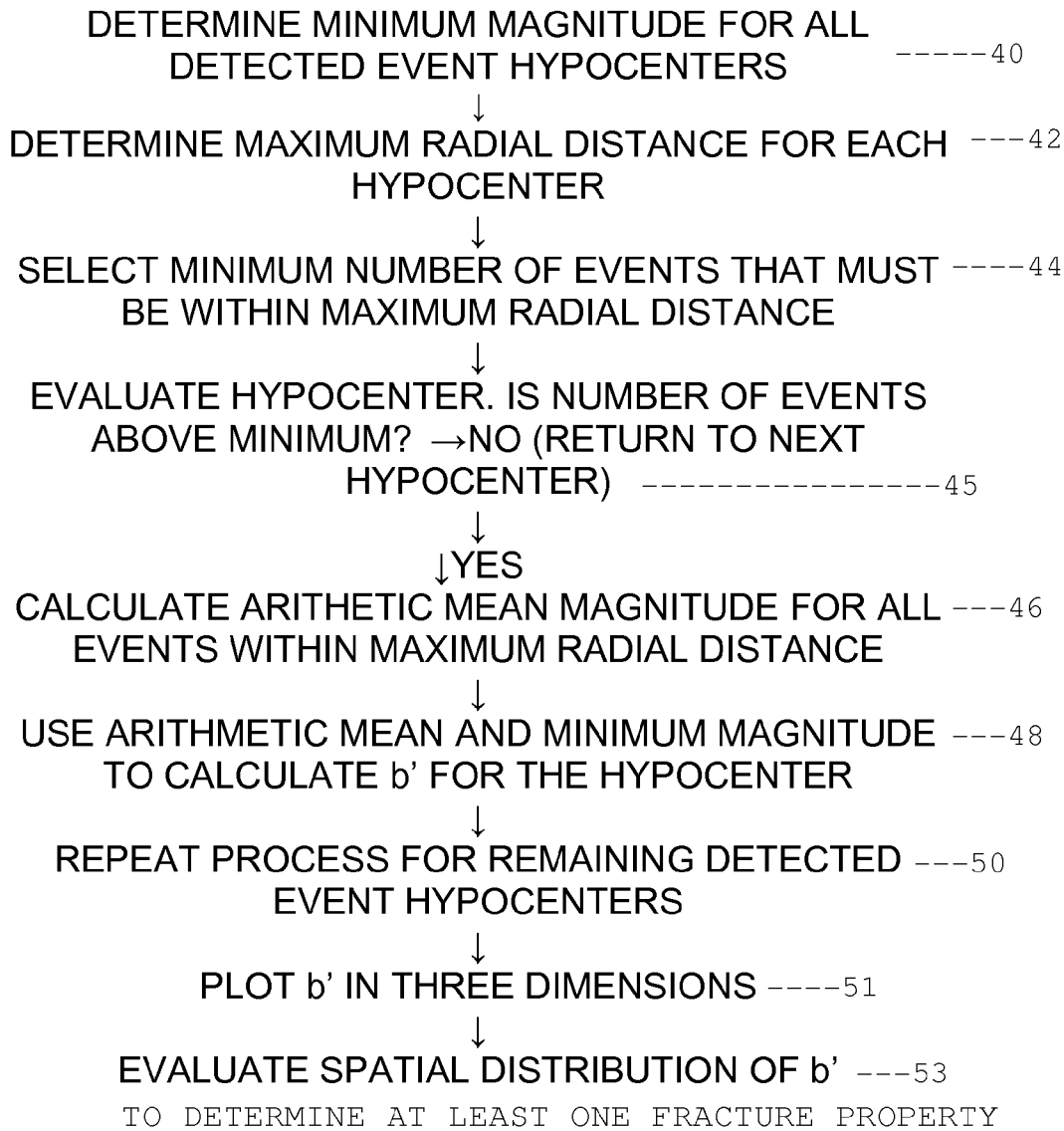
FIG. 2 is a flow chart showing an example method for calculating spatial changes in the value of b with respect to a node center.

First, with reference to determining the spatial distribution of modified b values (i.e., b') and referring to the flow chart in FIG. 2, at 40, after all the event hypocenters an times of occurrence have been determined, determine the smallest magnitude event detected (e.g., using the method described in the Duncan et al. patent referenced above) and use the magnitude value of that event for all subsequent calculations of b'.

The same minimum value of magnitude will also be used for calculations of b" as will be further explained below.

At 42, for each hypocenter of each detected seismic event, select a maximum radial distance, and locate and quantify the magnitudes of all seismic events detected wherein the hypocenters of such events occur within the radial distance limit. 400 meters has proven to be an effective value of radial distance limit, although this value is not a limitation on the scope of the present invention. The hypocenter for which the radial distance limit is applied at any time during the process may be referred to as a "node center."

At 44, select a minimum number of seismic events for which the hypocenters thereof must be located within the radial distance limit (e.g., 50) of the selected node center. At 45, if the number of detected seismic events is less than the minimum number, the particular hypocenter will not be used as a node center and it will be disregarded as a node center in subsequent calculations. The process returns to 42 and another hypocenter is tested as a node center using the same preselected radial distance limit. If the minimum number of events within the radial distance limit is met or exceeded, the process continues to 46.

Fifty has been empirically determined to be a practical minimum number of events within the radial distance limit, although more accurate results may possibly be obtained using a larger minimum number (e.g., 100). The exact number used as the minimum number of events may be empirically or otherwise (e.g., trial and error) determined, and is not intended to limit the scope of the present invention.

At 46, the arithmetic mean of the magnitudes of all the events located within the radial distance limit. At 48, the relationship shown below may be used to calculate the b' value (modified Gutenberg-Richter exponent) for the node center being evaluated.

$$b' = \frac{\log(e)}{M_{avg} - M_{min}} \quad (2)$$

in which (e) represents the natural logarithm base, Mavg represents the average magnitude value (i.e., the arithmetic mean) of all the seismic events within the radial distance limit of the node center and Mmin represents the minimum magnitude as described with reference to 40.

At 50, the foregoing steps 42 through 48 may be repeated for all seismic events that are determined to be valid node centers (i.e., they have enough events within the same selected radial distance limit from the selected event hypocenter). The process will stop at step 44 and return to step 42 for any event hypocenter that is not a valid node center as determined above in step 44. The process continues as described above until all detected seismic events have been processed. Depending on the spatial distribution of the detected seismic events, some or all of the detected seismic events will have calculated therefor a value of b'. At 51, the values of b' may be plotted in three dimensions as will be explained further below, and at 53, the spatial distribution of b' may be evaluated to make certain inferences about the properties of the fractures induced in the subsurface.

Figure 3:
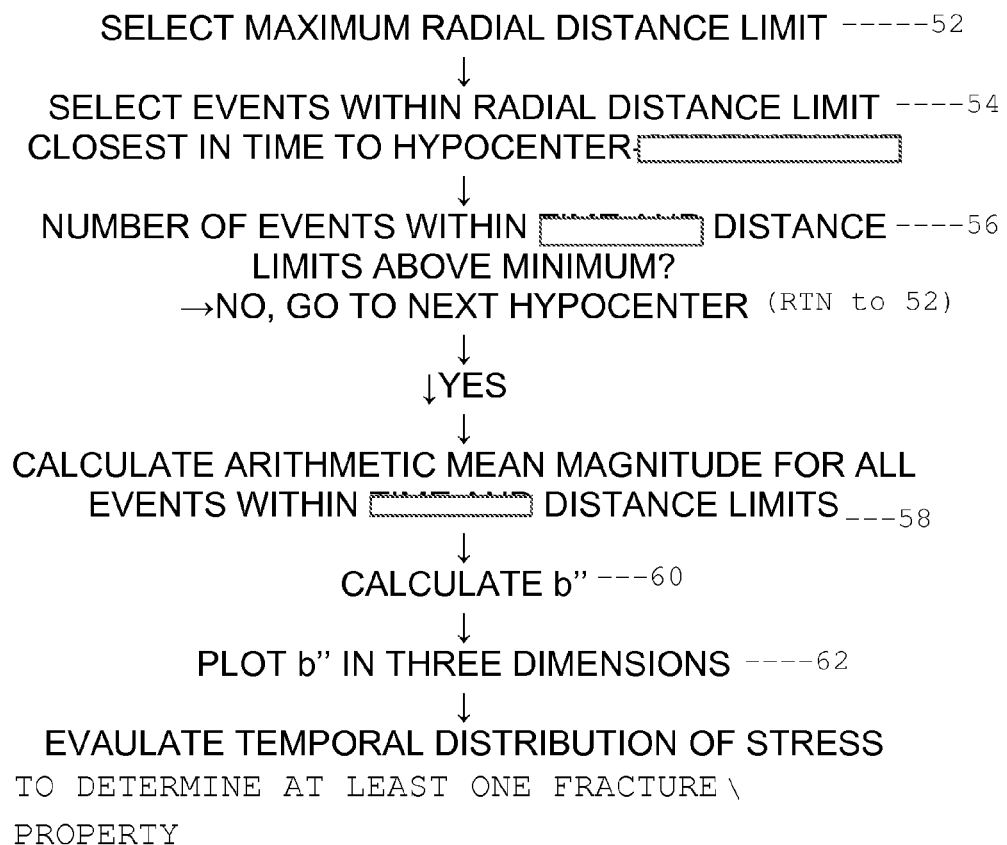
FIG. 3 is a flow chart showing an example method for calculating temporal changes in the value of b with respect to a node center.

Having determined spatial distribution of modified b values, one may then determine temporal values of modified b values using the following procedure explained with reference to the flow chart in FIG. 3).

At 52, for each hypocenter determined as explained above, select a maximum radial distance limit, as explained with reference to FIG. 2, locate and quantify the magnitudes of all seismic events located within the radial distance limit; the selected hypocenter is the center of the particular node being analyzed.

At 54, of the seismic events located in step 52, select the ones of the seismic events that are closest in time of occurrence to the seismic event selected as the node center.

At 56, if the number of seismic events within the radial distance limit is below the selected threshold (e.g., 50), disregard the hypocenter being evaluated as a node center. The process will return to step 52.

Also at 56, if the number of seismic events within the radial distance limit is above the selected threshold, the process continues to 58, wherein the arithmetic mean of all magnitudes of the seismic events closest in time and within the distance limits for the node center being processed is calculated. At 60, b" is calculated for the particular node center using equation (2).

The foregoing process steps 52 through 60 are repeated for all detected seismic events; for those that are valid node centers (validity determined explained above for step 56) a value of b" is determined. Stop the process at step 56 for any event hypocenter that is not a valid node center as determined above and return to step 52, and continue the foregoing until all the detected seismic events that are valid node centers have a value of b" calculated and assigned thereto. At 62, the b" values may be plotted in three dimensions. At 64, inferences may be made about the induced fractures using the spatial and temporal distribution of b" determined at 62.

Once the values of b' and b" have been determined and plotted as explained above, they may be used to determine spatial and temporal chances in effective stress in the subsurface volume of interest. It is known in the art that the Guttenberg-Richter exponent b is in general inversely proportional to effective stress. By observing spatial (using b') and temporal (using b") changes in the foregoing it is possible to image effective stress increases as a result of inducing seismic events in the subsurface, e.g., by fracture treatment as explained with reference to FIG. 1. Such imaging can enable identification of properties of the induced fractures. Such properties may include identifying the difference between tectonic/active (preexisting) fault features and induced fracture features, especially when combined with source mechanism inversion. An example source mechanism inversion procedure is described in I. V. Rodriguez et al, *Continuous hypocenter and source mechanism inversion via a Green's function-based matching pursuit algorithm*, The Leading Edge, European Association of Geoscientists and Engineers, Houten, The Netherlands, March 2010.

More subtle observed changes in b' and b" may enable identifying differences between purely reactivated existing fracture features and induced fracture features resulting only from the inducement of subsurface seismic events (e.g., fracture treatment). Such identification may enable characterization of individual fracture zones by type within a fracture treatment to optimize the discrete fracture network as well as to characterize stimulated volumes and fracture network geometries through the enhanced resolution made available by determining spatial and temporal variations in the value of b. Identification techniques based on b values is described, for example, in Scott Wessels, Alejandro De La Pena, Michael Kratz, Sherilyn Williams-Stroud and Terry Jbeilli, *Identifying faults and fractures using source mechanism inversion, b values, and energy release rates*, First Break, European Association of Geoscientists and Engineers, Houten, The Netherlands, July 2011.

It may also be possible to infer the stress field evolution during a fracture treatment, enabling comparison of rates of fracturing-induced stress field changes to fracture treatment data (e.g., rate of pumping fluid, pressure, density of the fluid and fluid proppant content). Such inferences may enable more desirable and/or effective fracture treatment schedules to optimize future fracturing operations.

Additionally, plotting the first spatial derivative of the determined b' and b" values and comparing that to preexisting stress field data can enable developing a better formation anisotropy model for the subsurface volume of interest. This information will all come from plotting instantaneous b' and b" in three dimensions and generating a visual representation (such as on a computer monitor) how it changes, in that specific populations of similar b' and b" values may group together within or proximate fractures (except when observing the first derivative of these values). Observing b" may show the stress field changes in time. Comparing temporal changes in stress field may also enable calculating the stress drop per subsurface seismic event, giving a more accurate constraint on the amount of seismic energy released by the fracture treatment. The foregoing may be performed using a well known and published calculation for stress drop.

Figure 4:
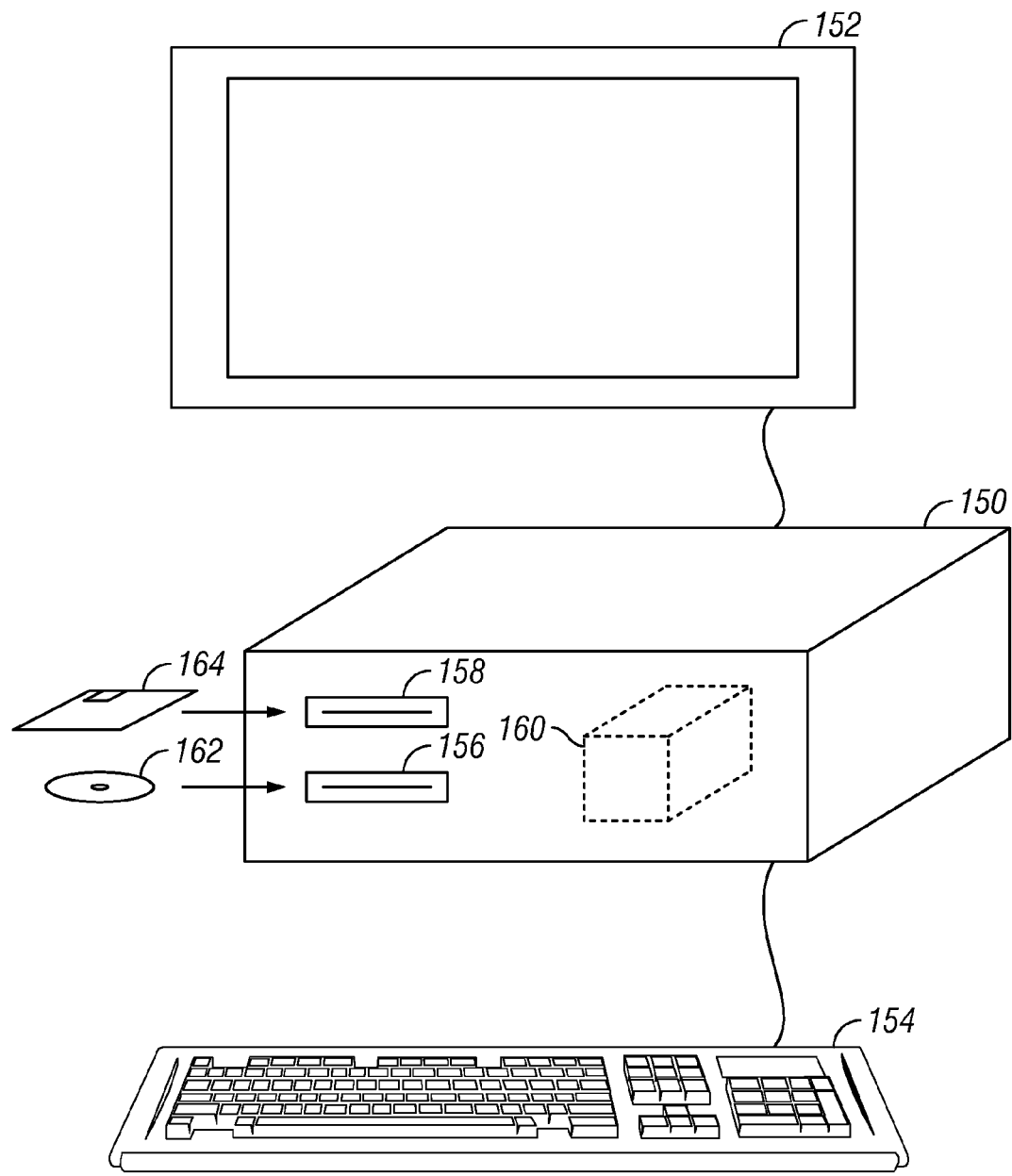
FIG. 4 shows a programmable computer, display and computer readable storage media.

In another aspect, the invention relates to computer readable media having computer programs stored thereon. Referring to FIG. 4, the foregoing process as explained with reference to FIGS. 1-3 can be embodied in computer-readable code. The code can be stored on a computer readable medium, such as floppy disk 164, CD-ROM 162 or a magnetic (or other type) hard drive 166 forming part of a general purpose programmable computer. The computer, as known in the art, includes a central processing unit 150, a user input device such as a keyboard 154 and a user display 152 such as a flat panel LCD display or cathode ray tube display. The computer may form part of the recording unit (12 in FIG. 1) or may be another computer. According to this aspect of the invention, the computer readable medium includes logic operable to cause the computer to execute acts as set forth above and explained with respect to the previous figures. The three dimensional plots of b' and b" described above, as well as histograms, coordinate graphs and similar presentations may also be presented on the user display 152 for interpretation While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for evaluating fractures induced in subsurface formations, comprising:
   determining hypocenters and origin times of induced seismic events from seismic signals detected by seismic sensors deployed above a volume of the subsurface formations to be evaluated and recording the detected signals for a selected time;
   determining, using a computer, a modified Gutenberg-Richter exponent for each induced seismic event having at least a selected number of other induced seismic events within a selected radial distance thereof;
   using a spatial distribution of the modified Gutenberg-Richter exponents to determine at least one property of the induced fractures.

2. The method of claim 1 wherein the at least one property comprises identification of whether an induced seismic event is caused by reactivation of an existing fault or creation of a new fault.

3. The method of claim 1 wherein the at least one property comprises identification of whether an induced seismic event is a result of a tectonic fault or an induced fault.

4. The method of claim 1 wherein determining the modified Gutenberg-Richter exponent for each induced seismic event comprises:
   identifying a smallest magnitude one of the induced seismic events;
   calculating an arithmetic mean of magnitudes of all induced seismic events within the selected radial distance; and
   using the smallest magnitude and arithmetic mean to determine the modified Gutenberg-Richter exponent.

5. The method of claim 1 wherein determining the modified Gutenberg-Richter exponent for each induced seismic event comprises:
   identifying a smallest magnitude one of the induced seismic events;
   calculating an arithmetic mean of magnitudes of all induced seismic events within the selected radial distance and closest in time of occurrence to the induced seismic event being evaluated; and
   using the smallest magnitude and arithmetic mean to determine the modified Gutenberg-Richter exponent.

6. The method of claim 1 wherein the induced seismic events are generated by pumping a fracture treatment into a wellbore drilled through selected subsurface formations.

7. A computer readable medium having stored thereon a computer program, the program having logic operable to cause programmable computer to perform a method for evaluating fractures induced in subsurface formations, the method including steps comprising:
   determining hypocenters and origin times of induced seismic events from seismic signals detected by seismic sensors deployed above a volume of the subsurface formations to be evaluated and recording the detected signals for a selected time;
   determining a modified Gutenberg-Richter exponent for each induced seismic event having at least a selected number of other induced seismic events within a selected radial distance thereof;
   using a spatial distribution of the modified Gutenberg-Richter exponents to determine at least one property of the induced fractures.

8. The computer readable medium of claim 7 wherein the at least one property comprises identification of whether an induced seismic event is caused by reactivation of an existing fault or creation of a new fault.

9. The computer readable medium of claim 7 wherein the at least one property comprises identification of whether an induced seismic event is a result of a tectonic fault or an induced fault.

10. The computer readable medium of claim 7 wherein determining the modified Gutenberg-Richter exponent for each induced seismic event comprises:
    identifying a smallest magnitude one of the induced seismic events;
    calculating an arithmetic mean of magnitudes of all induced seismic events within the selected radial distance; and
    using the smallest magnitude and arithmetic mean to determine the modified Gutenberg-Richter exponent.

11. The computer readable medium of claim 7 wherein the determining he modified Gutenberg-Richter exponent for each induced seismic event comprises:
    identifying a smallest magnitude one of the induced seismic events;

calculating an arithmetic mean of magnitudes of all induced seismic events within the selected radial distance and closest in time of occurrence to the induced seismic event being evaluated; and using the smallest magnitude and arithmetic mean to determine the modified Gutenberg-Richter exponent.

12. The computer readable medium of claim 7 wherein the induced seismic events are generated by pumping a fracture treatment into a wellbore drilled through selected subsurface formations.

* * * * *